United States Patent
Saito

(10) Patent No.: US 12,027,726 B2
(45) Date of Patent: Jul. 2, 2024

(54) SECONDARY BATTERY MANUFACTURING METHOD AND SECONDARY BATTERY

(71) Applicant: PRIMEARTH EV ENERGY CO., LTD., Kosai (JP)

(72) Inventor: Shigeki Saito, Hamamatsu (JP)

(73) Assignee: PRIMEARTH EV ENERGY CO., LTD., Kosai (JP)

( * ) Notice: Subject to any disclaimer, the term of this patent is extended or adjusted under 35 U.S.C. 154(b) by 230 days.

(21) Appl. No.: 17/374,797

(22) Filed: Jul. 13, 2021

(65) Prior Publication Data

US 2022/0029254 A1 Jan. 27, 2022

(30) Foreign Application Priority Data

Jul. 27, 2020 (JP) .................. 2020-126067

(51) Int. Cl.
*H01M 50/536* (2021.01)
*B23K 13/01* (2006.01)
*B23K 26/22* (2006.01)
*B23K 101/38* (2006.01)
*B23K 103/10* (2006.01)
*B23K 103/12* (2006.01)
*H01M 50/566* (2021.01)

(52) U.S. Cl.
CPC .......... *H01M 50/536* (2021.01); *B23K 13/01* (2013.01); *B23K 26/22* (2013.01); *H01M 50/566* (2021.01); *B23K 2101/38* (2018.08); *B23K 2103/10* (2018.08); *B23K 2103/12* (2018.08)

(58) Field of Classification Search
CPC ......... H01M 50/536; H01M 50/566; H01M 50/516; H01M 50/522; H01M 2220/20; B23K 13/01; B23K 26/22; B23K 2101/38; B23K 2103/10; B23K 2103/12; B23K 26/21; Y02E 60/10
See application file for complete search history.

(56) References Cited

FOREIGN PATENT DOCUMENTS

| DE | 102012216475 A1 | * | 3/2014 | ............ B23K 10/02 |
|---|---|---|---|---|
| JP | 2000011964 A | | 1/2000 | |
| JP | 2013229970 | * | 11/2013 | |
| JP | 2015072854 A | * | 4/2015 | |
| JP | 6210489 B2 | | 10/2017 | |

OTHER PUBLICATIONS

Monroe Engineering [Fusion Welding] (Year: 2019).*
Yamada et al. JP2013229970, English translation, 2013.*
Machine translation of JP2015-072854 A, published on Apr. 16, 2015 (Year: 2015).*
Machine translation of DE 102012216475 A1, published on Mar. 20, 2014 (Year: 2014).*
Japanese Patent Office, Office Action Issued in Application No. 2020-126067, Nov. 22, 2022, 5 pages. (Submitted with Machine Translation).

* cited by examiner

*Primary Examiner* — Anca Eoff
(74) *Attorney, Agent, or Firm* — McCoy Russell LLP

(57) ABSTRACT

A secondary battery manufacturing method according to an example embodiment of the present disclosure includes an electromagnetic welding step of joining together a first metallic component and a second metallic component included in the secondary battery by electromagnetic welding, and a laser welding step of applying laser light to weld an unjoined part of the first metallic component and the second metallic component, the unjoined part being not joined by the electromagnetic welding step.

6 Claims, 4 Drawing Sheets

SECONDARY BATTERY MANUFACTURING METHOD AND SECONDARY BATTERY

CROSS REFERENCE TO RELATED APPLICATION

The present application claims priority to Japanese Patent Application No. 2020-126067 filed on Jul. 27, 2020. The entire contents of the above-listed application is hereby incorporated by reference for all purposes.

TECHNICAL FIELD

The present disclosure relates to a secondary battery manufacturing method and a secondary battery.

BACKGROUND

A secondary battery such as a lithium-ion battery and a nickel-hydrogen battery is mounted on vehicles such as hybrid vehicles, plug-in hybrid vehicles, and electric-powered vehicles that use electric power as a driving force. A secondary battery contains many metallic components, and the metallic components are joined together to manufacture the secondary battery.

As an example of joining metallic components, Japanese Patent No. 6210489 discloses a method of inserting layered metal plates into a space of a U-shaped coil and electromagnetically welding them, and passing electric current through a thin copper wire placed to penetrate the metal plates to melt the thin copper wire, and thereby joining the metal plates.

SUMMARY

However, since a large electromagnetic force is generated around the coil, there is a possibility that a space is left between joint surfaces of the layered metal plates. In this case, the space between the joint surfaces of the metal plates cannot be filled by merely melting the thin copper wire placed in the metal plates, which raises a problem that the current-carrying performance of the joined metal plates is low.

The present disclosure has been accomplished to solve the above problem and an object of the present disclosure is thus to provide a secondary battery manufacturing method and a secondary battery that enhance the current-carrying performance of joined metallic components.

A secondary battery manufacturing method according to one example embodiment of the present disclosure includes an electromagnetic welding step of joining together a first metallic component and a second metallic component included in the secondary battery by electromagnetic welding, and a laser welding step of applying laser light to weld an unjoined part of the first metallic component and the second metallic component, the unjoined part being not joined by the electromagnetic welding step.

Further, the electromagnetic welding step may electromagnetically weld the first metallic component and the second metallic component by bringing the coil to be used for electromagnetic welding close to the first metallic component and the second metallic component from one side of the first metallic component and the second metallic component.

Further, the electromagnetic welding step may electromagnetically weld a plurality of first metallic component and a plurality of second metallic components simultaneously.

A secondary battery according to one example embodiment of the present disclosure includes a first metallic component and a second metallic component, wherein a joint surface of the first metallic component and the second metallic component includes an electromagnetically welded part and a laser-welded part.

The first metallic component and the second metallic component may be made of the same type of metal. For example, the first metallic component and the second metallic component may be made of aluminum.

Further, the first metallic component and the second metallic component may be made of different types of metal. For example, the first metallic component may be made of aluminum, and the second metallic component may be made of copper.

According to the present disclosure, there are provided a secondary battery manufacturing method and a secondary battery that enhance the current-carrying performance of joined metallic components.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

One embodiment of the present disclosure will be described hereinafter with reference to the drawings. A secondary battery manufacturing method according to one embodiment of the present disclosure includes an electromagnetic welding step of electromagnetically welding metallic components to be joined together that are included in a secondary battery, and a laser welding step of laser-welding the electromagnetically welded metallic components.

Figure 1:
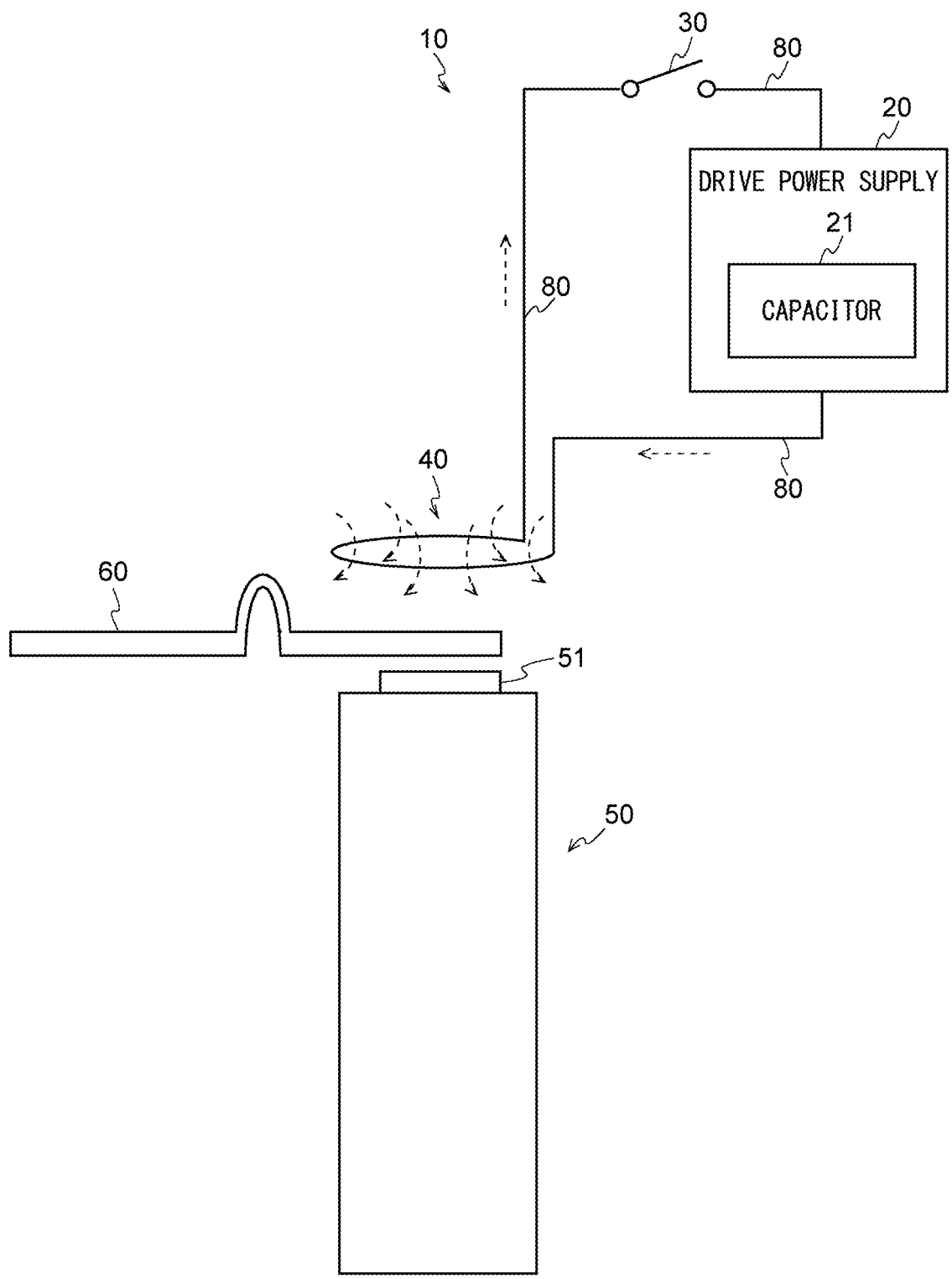
FIG. 1 is a view showing an electromagnetic welding system and an electromagnetic welding step according to one embodiment of the present disclosure.

FIG. 1 is a view showing an electromagnetic welding step according to one embodiment of the present disclosure. An electromagnetic welding system 10 as shown in FIG. 1 is used in the electromagnetic welding step. The electromagnetic welding system 10 includes a drive power supply 20, a switch 30, and a coil 40. Those devices and components are connected by a power line 80.

The drive power supply 20 is a device that supplies electric power to the coil 40. The drive power supply 20 includes a capacitor 21. The switch 30 is placed between the drive power supply 20 and the coil 40. When the switch 30 is closed, electric power stored in the capacitor 21 is supplied to the coil 40 through the power line 80.

The coil 40 is placed on one side of metallic components 51 and 60 to be joined together. In the example shown in FIG. 1, the coil 40 is placed on the upper side of the metallic components 51 and 60 to be joined together. When electric power is supplied from the drive power supply 20, the coil 40 generates magnetic field lines as shown in FIG. 1 by electromagnetic induction. Although a circular coil is used in the embodiment shown in FIG. 1, the shape of a coil is not limited thereto. For example, a coil of various shapes such as a square and an ellipse can be used.

In the embodiment shown in FIG. 1, a bus bar 60 that connects electrode terminals 51 of two secondary batteries 50 is used as an example of the metallic components to be joined together. The metallic components 51 and 60 to be joined together are placed on the side toward which the magnetic field lines generated from the coil 40 are moving. The metallic components 51 and 60 to be joined together are placed with a space therebetween, so that they are joined by electromagnetic welding.

The metallic components 51 and 60 may be made of the same type of metal. For example, in a positive terminal, the electrode terminal 51 and the bus bar 60 may be made of aluminum. Further, the metallic components 51 and 60 may be made of the different types of metal. For example, in a negative terminal, the electrode terminal 51 may be made of aluminum, and the bus bar 60 may be made of copper. Note that another conductive metal may be used for the metallic components 51 and 60.

Figure 3:
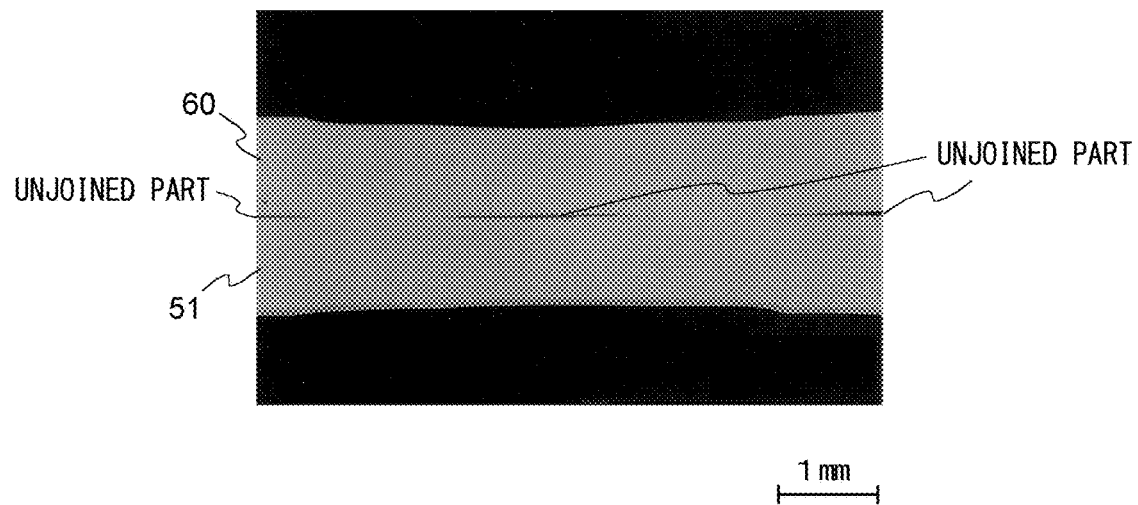
FIG. 3 is a view showing metallic components after electromagnetic welding.

In the electromagnetic welding step, the coil 40 to be used for electromagnetic welding is brought close to the metallic components 51 and 60 to be joined together from one side of the metallic components 51 and 60, and thereby the metallic components 51 and 60 are electromagnetically welded. To be specific, the bus bar 60 is energized toward the electrode terminal 51 by an electromagnetic force generated in the coil 40, and collides with the electrode terminal 51. As a result, the bus bar 60 and the electrode terminal 51 are joined. In this step, a large electromagnetic force can be generated around the coil 40, such as immediately below the coil 40. In this case, the bus bar 60 and the electrode terminal 51 located immediately below the coil 40 are partially not joined, and a space can be left between the bus bar 60 and the electrode terminal 51 and an unjoined part of the bus bar 60 and the electrode terminal 51 can be left as shown in FIG. 3. Thus, in the present disclosure, after electromagnetically welding the metallic components 51 and 60 to be joined together, laser welding is performed on the joined metallic components 51 and 60.

Figure 2:
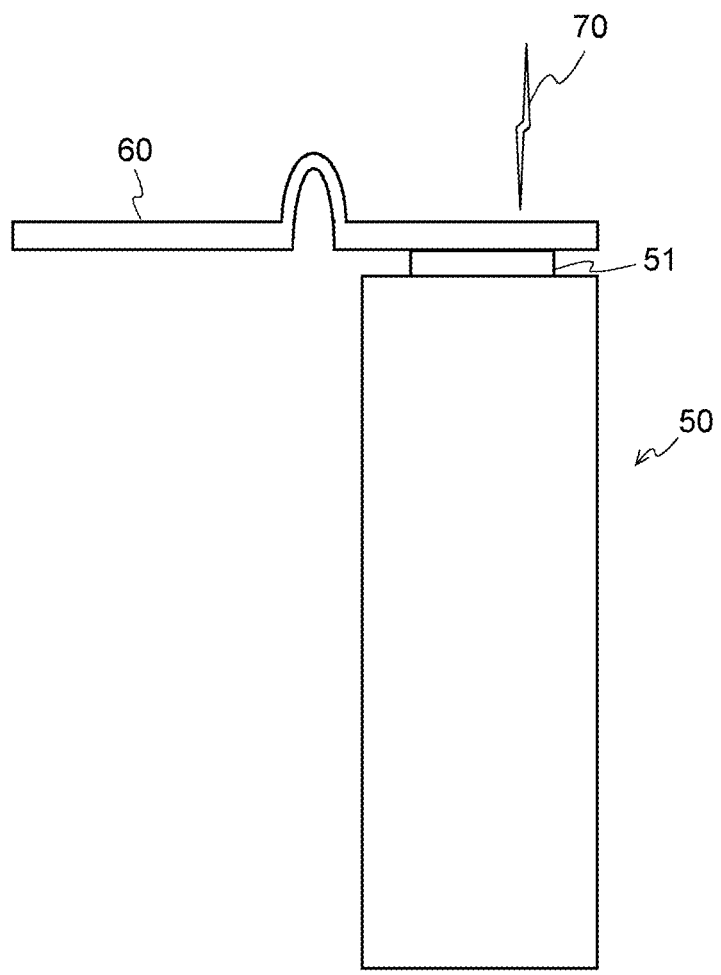
FIG. 2 is a view showing a laser welding step according to one embodiment of the present disclosure.

FIG. 2 is a view showing a laser welding step according to one embodiment of the present disclosure. In this embodiment, laser light 70 is applied to the unjoined part of the metallic components 51 and 60 that are not joined in the above-described electromagnetic welding step. The unjoined part of the metallic components 51 and 60 can be estimated from the positions of the metallic components 51 and 60 located immediately below the coil 40 in the electromagnetic welding step, for example. In the laser welding step, the laser light 70 with an output power enough to reach the unjoined part of the metallic components 51 and 60 is used. The laser light 70 can be applied from different directions according to the shape of the metallic components 51 and 60. For example, in the example shown in FIG. 2, the laser light 70 is preferably applied from the side of the metallic component 60.

As described above, a manufacturing method of the secondary battery 50 according to this embodiment includes an electromagnetic welding step of joining the first metallic component 51 and the second metallic component 60 included in the secondary battery 50 by electromagnetic welding, and a laser welding step of applying laser light to weld an unjoined part of the first metallic component 51 and the second metallic component 60 not joined by the electromagnetic welding step.

Figure 4:
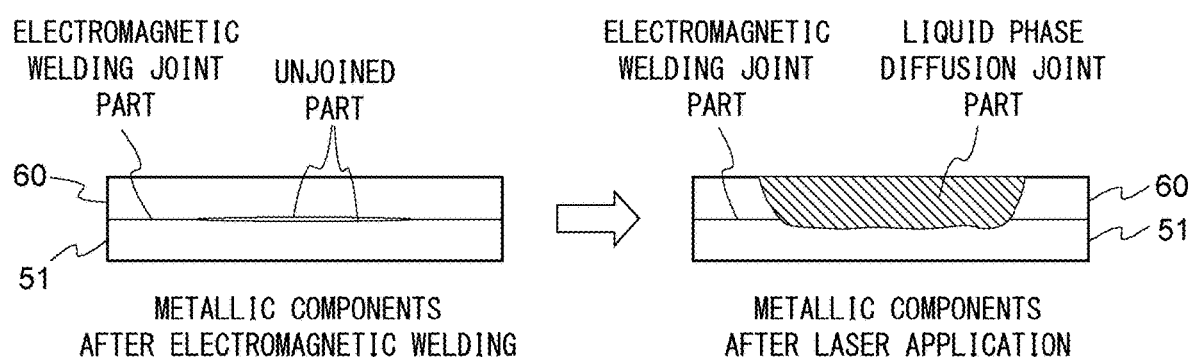
FIG. 4 is a schematic view showing metallic components after electromagnetic welding and metallic components after laser application.

On the boundary surface between the electromagnetically welded metallic components 51 and 60, an oxide film, oil and the like are removed by a metal jet caused by collision, and metallic atoms become easily diffused. When laser is applied to the metallic component 60 in this state to melt it, liquid phase diffusion occurs, and the unjoined part disappears as shown in FIG. 4. This enhances the current-carrying performance of the joined metallic components 51 and 60. This effect is not obtained when laser welding is performed on the metallic components on which electromagnetic welding is not performed.

As a result that laser welding is performed on the unjoined part of the metallic components 51 and 60 to be joined together, an electromagnetically welded part (electromagnetic welding joint part) and a laser-welded part (liquid phase diffusion joint part) are generated on the joint surface of the metallic components as shown in FIG. 4.

Figure 5:
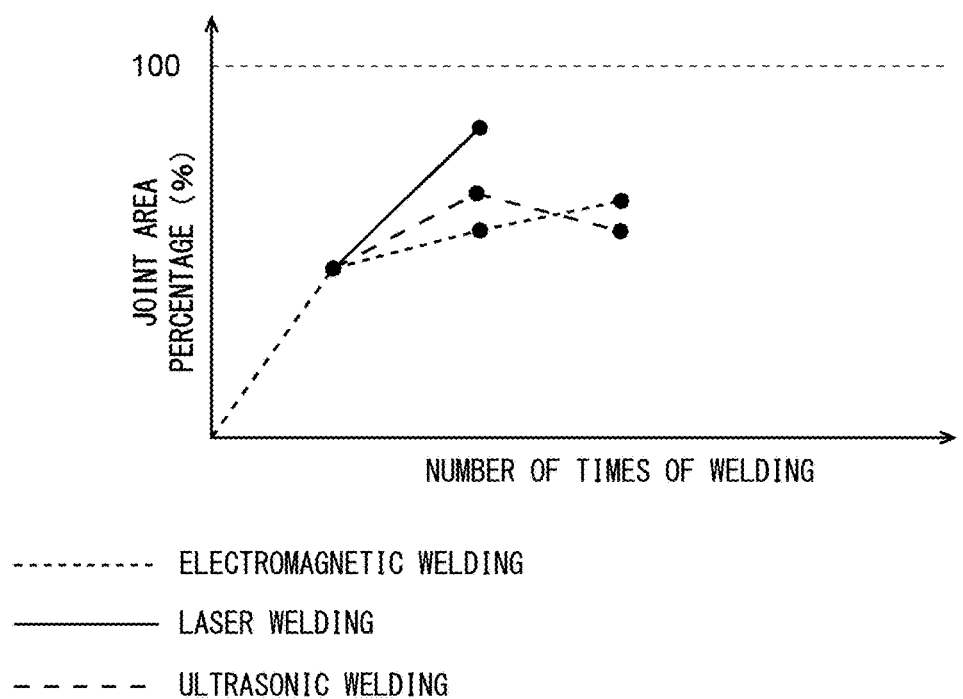
FIG. 5 is a view showing an example of the joint area percentage of metallic components to be joined together.

FIG. 5 is a view showing an example of the joint area percentage of metallic components to be joined together. FIG. 5 shows the joint area percentage when laser welding is performed after electromagnetic welding is performed on the metallic components to be joined together, the joint area percentage when electromagnetic welding is further performed after electromagnetic welding is performed on the metallic components to be joined together, and the joint area percentage when ultrasonic welding is performed after electromagnetic welding is performed on the metallic components to be joined together.

As shown in FIG. 5, the joint area percentage when laser welding is performed after electromagnetic welding is the highest. Further, the joint area percentage when laser welding is performed one time after electromagnetic welding is higher than the joint area percentage when electromagnetic welding is performed three times. This is because, while a certain space is required for electromagnetic welding, since a space of the unjoined part after performing electromagnetic welding one time is small, when electromagnetic welding is further performed after electromagnetic welding, an increase in the joint area percentage is smaller than when laser welding is performed after electromagnetic welding.

Further, the joint area percentage when laser welding is performed one time after electromagnetic welding is higher than the joint area percentage when ultrasonic welding is performed one time or two times after electromagnetic welding. This is because, since ultrasonic welding has the effect of separating the joint by vibration, when ultrasonic welding is performed after electromagnetic welding, an increase in the joint area percentage is smaller than when laser welding is performed after electromagnetic welding. These results show that the secondary battery manufacturing method according to the present disclosure efficiently generates a joint surface of metallic components to be joined together and thereby improves the productivity of a secondary battery.

Further, in the above-described embodiment, the coil 40 is brought close to the metallic components 51 and 60 to be joined together from one side of the metallic components 51 and 60, so that they are electromagnetically welded. In other words, the metallic components 51 and 60 to be joined together are not inserted into the space of the coil 40. This eliminates the step of inserting the metallic components 51 and 60 to be joined together into the coil 40 and thereby improves the productivity of a secondary battery.

OTHER EMBODIMENT

Figure 6:
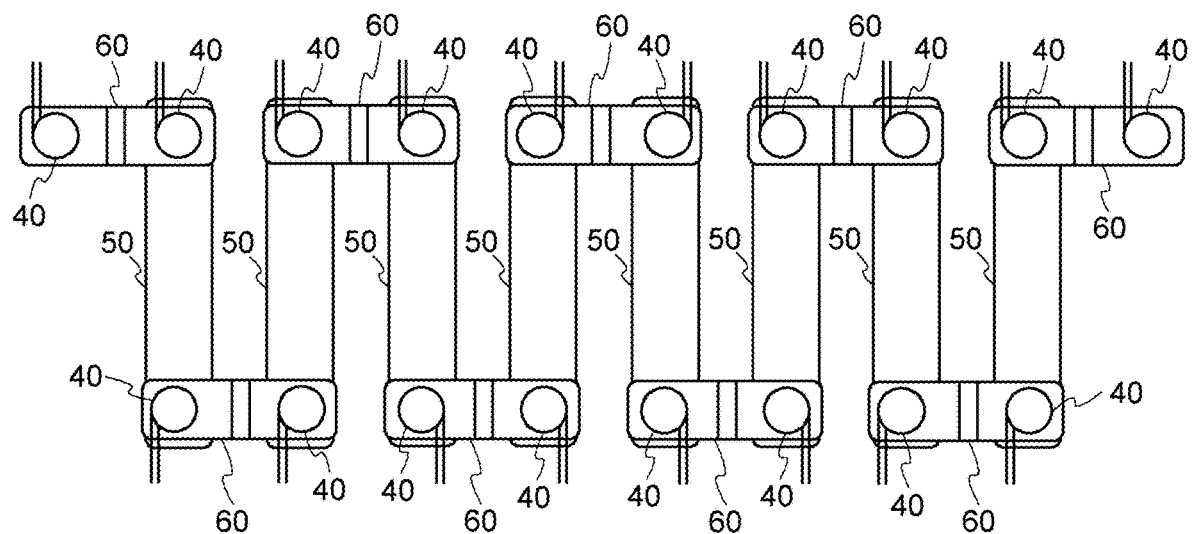
FIG. 6 is a view showing an electromagnetic welding step according to another embodiment of the present disclosure.

FIG. 6 is a view showing an electromagnetic welding step according to another embodiment of the present disclosure. FIG. 6 is a view showing a plurality of coils 40, a plurality of secondary batteries 50, and a plurality of metallic components 60 viewed from above. As shown in FIG. 6, the plurality of secondary batteries 50 are arranged adjacent to one another. Further, the bus bar 60 is placed above the two adjacent secondary batteries 50 so as to face electrode terminals 51 (not shown). Further, the plurality of coils 40 are placed above the electrode terminals 51 of the secondary batteries 50 and the bus bar 60.

By placing the electrode terminals 51 of the secondary batteries 50 and the bus bar 60 in this manner and bringing the coil 40 close to the electrode terminals 51 and the bus bar 60 from one side thereof to electromagnetically weld them, the plurality of electrode terminals 51 and the bus bar 60 are electromagnetically welded simultaneously. This improves the productivity of a secondary battery.

Further, in another embodiment, besides the above-described electrode terminal and bus bar, various metallic components such as an electrode washer, a swage, and a current collector included in a secondary battery may be used as metallic components to be joined together.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The invention claimed is:

1. A secondary battery comprising:
a first metallic component; and
a second metallic component,
wherein a joint surface of the first metallic component and the second metallic component includes an electromagnetically welded part and a laser-welded part, wherein the laser-welded part is a liquid phase diffusion joint part.

2. The secondary battery according to claim 1, wherein the first metallic component and the second metallic component are made of the same type of metal.

3. The secondary battery according to claim 2, wherein the first metallic component and the second metallic component are made of aluminum.

4. The secondary battery according to claim 1, wherein the first metallic component and the second metallic component are made of different types of metal.

5. The secondary battery according to claim 1, wherein the first metallic component is made of aluminum, and the second metallic component is made of copper.

6. The secondary battery according to claim 1, wherein the first metallic component is an electrode terminal, and the second metallic component is a bus bar electrically connecting the electrode terminal and another electrode terminal of another secondary battery.

* * * * *